US012495278B2

(12) United States Patent
Vasili et al.

(10) Patent No.: US 12,495,278 B2
(45) Date of Patent: Dec. 9, 2025

(54) HUNT GROUP MESSAGING IN A NETWORK

(71) Applicant: VERIZON PATENT AND LICENSING INC., Basking Ridge, NJ (US)

(72) Inventors: Chaithanya Vasili, San Ramon, CA (US); Ashwin R. Kamath, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 287 days.

(21) Appl. No.: 17/957,611

(22) Filed: Sep. 30, 2022

(65) Prior Publication Data

US 2024/0114321 A1  Apr. 4, 2024

(51) Int. Cl.
*H04W 4/00* (2018.01)
*H04L 9/40* (2022.01)
*H04M 3/46* (2006.01)
*H04W 4/14* (2009.01)

(52) U.S. Cl.
CPC ........... *H04W 4/14* (2013.01); *H04L 63/0876* (2013.01); *H04M 3/465* (2013.01)

(58) Field of Classification Search
CPC ....... H04M 1/663; H04M 3/465; H04W 4/12; H04W 4/14; H04L 63/0876
USPC ......................... 370/259, 356, 352
See application file for complete search history.

(56) References Cited

U.S. PATENT DOCUMENTS

| | | | | |
|---|---|---|---|---|
| 5,490,211 A | * | 2/1996 | Adams | H04M 3/51 379/93.24 |
| 6,285,752 B1 | * | 9/2001 | Rice | H04M 3/465 379/265.11 |
| 7,286,661 B1 | * | 10/2007 | Balk | H04M 3/465 709/227 |
| 2011/0130168 A1 | * | 6/2011 | Vendrow | H04L 51/216 455/556.1 |
| 2015/0244864 A1 | * | 8/2015 | Salazar | H04Q 3/64 379/265.11 |
| 2020/0228666 A1 | * | 7/2020 | Kendrick | G06Q 20/023 |
| 2022/0053004 A1 | * | 2/2022 | Rule | H04L 63/0876 |
| 2022/0191329 A1 | * | 6/2022 | Lew | H04W 4/14 |
| 2022/0264259 A1 | * | 8/2022 | Balasaygun | H04M 3/428 |

* cited by examiner

*Primary Examiner* — Khai M Nguyen

(57) ABSTRACT

In some aspects, the techniques described herein relate to a method including: receiving, via a network, a message addressed to a mobile device number (MDN); identifying, by the network, a set of hunt group devices associated with the MDN, the set of hunt group devices including at least a first hunt group device and a second hunt group device; transmitting, by the network, the message to each hunt group device in the set of hunt group devices; receiving, by the network, a reply to the message from the first hunt group device; transmitting, by the network, the reply to a sender of the message; and transmitting, by the network, the reply to at least the second hunt group device.

20 Claims, 4 Drawing Sheets

HUNT GROUP MESSAGING IN A NETWORK

BACKGROUND

Current networks cannot provide hunt group functionality for non-voice data paths. Specifically, while such networks may allow for a call to a mobile number to be relayed to other devices, such networks cannot route non-voice data from one number of multiple devices.

DETAILED DESCRIPTION

Figure 1:
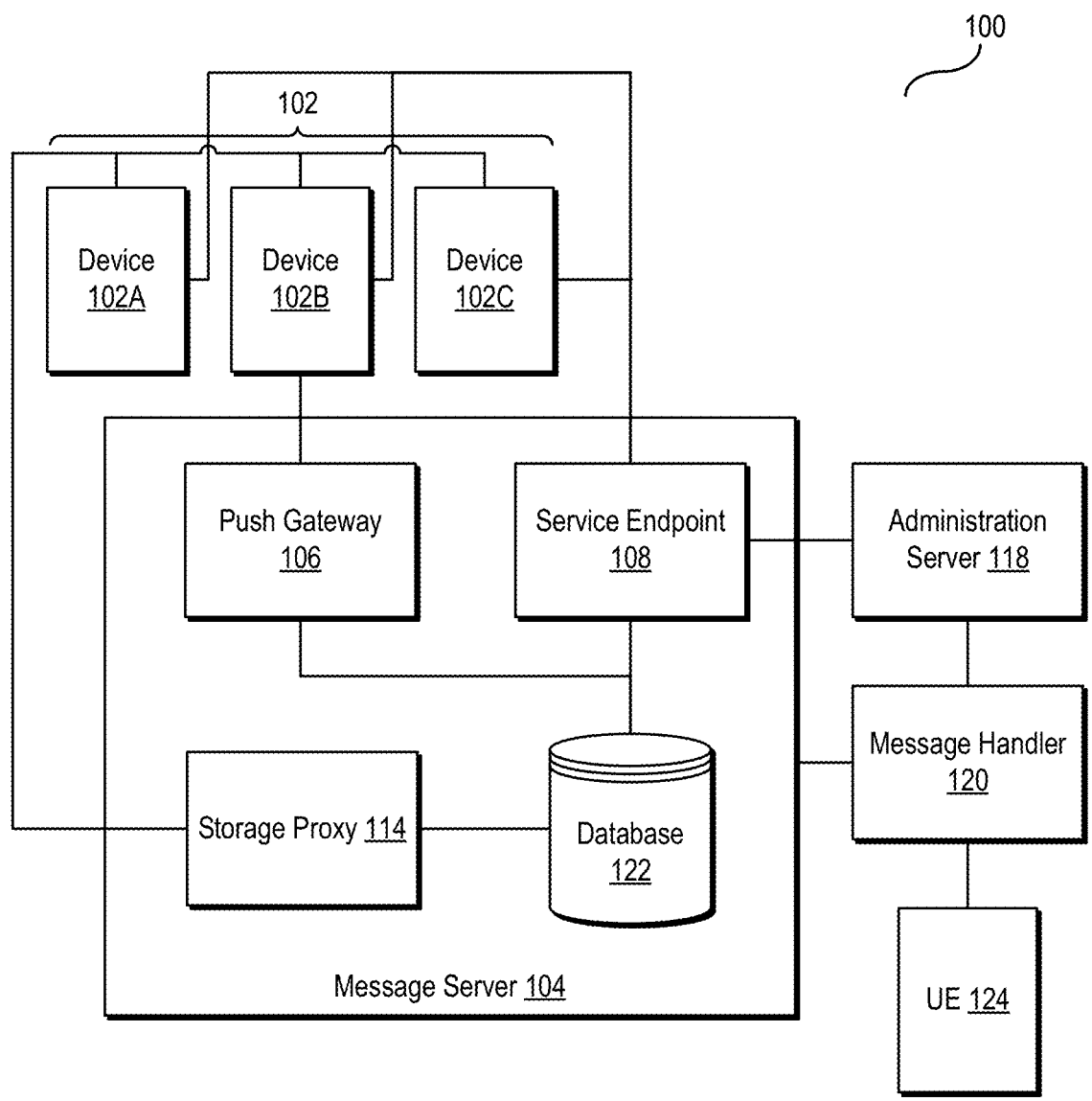
FIG. 1 is a block diagram illustrating a device for providing hunt group messaging capabilities in a network.

In the various embodiments described herein, a system, method, and computer-readable medium are disclosed, which enable one-to-many communications between a sender and hunt group devices configured to a single mobile device number (MDN). As used herein, a hunt group refers to a set of computing devices that are capable of responding to a message directed toward a single endpoint (e.g., MDN). A network configures the MDN to support hunt group messaging capabilities, wherein a plurality of user equipment (UE) is associated with the MDN (which may be a virtual number). When a sender sends a message to the MDN, the network delivers the message to each hunt group device associated with the MDN. In some implementations, the network can convert a short message service (SMS) or multimedia messaging service (MMS) message to an Internet Message Access Protocol (IMAP) message (or similar format such as Rich Communication Services (RCS), or iMessage) and deliver the messages to local applications running on each hunt group device. A given hunt group device can then reply to the message by transmitting a reply to the network. The network can convert the reply to an SMS or MMS and transmit the reply to the sender. The network can also write the reply to a storage device (e.g., an IMAP mailbox) that facilitates the delivery of the reply to each hunt group device. In some scenarios, the network can monitor the time it takes to receive a reply from the hunt group devices. If no hunt group device replies within a designated time window, the network can deliver the message to an escalation point (i.e., a designated hunt group device) that can reply to the message.

In some aspects, the techniques described herein relate to methods performed by a network to facilitate hunt group messages. The network can receive a message addressed to a mobile device number (MDN) and, in response, can identify a set of hunt group devices associated with the MDN. These hunt group devices can include at least a first hunt group device and a second hunt group device. The network transmits the message to each hunt group device in the set of hunt group devices and receives a reply to the message from the first hunt group device. In response, the network transmits the reply to the sender of the message and also transmits the reply to at least the second hunt group device.

In some implementations, the message can be a short message service (SMS) or multimedia messaging service (MMS) message received via a Short Message Service Center (SMSC) or Multimedia Messaging Service Center (MMSC), respectively, of the network. In some implementations, the network can transmit a push notification to an application executing on a respective hunt group device prior to delivering the message. In some implementations, the network can write the message to a mailbox associated with the MDN. In some implementations, the network can write the reply to the mailbox associated with the MDN. In some implementations, the network can convert the reply to an SMS or MMS message and transmit the SMS or MMS message to the sender. In some implementations, the network can set a sender field of the SMS or MMS message to the MDN prior to transmitting the reply.

The disclosure further provides computer-readable media and device implementations of the aforementioned methods, all of which are described in more detail herein.

FIG. 1 is a block diagram illustrating a device for providing hunt group messaging capabilities in a network.

In system 100, message server 104 facilitates hunt group messages between sender UE 124 and hunt group devices such as device 102A, device 102B, or device 102C (collectively, hunt group devices 102). In some implementations, UE 124 can comprise any device capable of sending SMS or MMS messages. In some implementations, hunt group devices 102 may include any computing device capable of receiving data over a network and displaying data to a user. In some implementations, hunt group devices 102 may comprise mobile devices, although the disclosure is not limited as such.

In an embodiment, message server 104 can receive messages from a message handler 120 of a network. In an embodiment, the message handler 120 can be one or both of a Short Message Service Center (SMSC) or Multimedia Messaging Service Center (MMSC). In an embodiment, the sender UE 124 can transmit SMS or MMS messages (SMS or MMS are referred to generally as "mobile messages") to an MDN associated with a hunt group. Specific known details on how to generate and send SMS or MMS messages from a UE to a core network are not limiting and not described herein. Ultimately, the message handler 120 receives the SMS or MMS message from the sender UE 124. In an embodiment, the sender UE 124 can identify the MDN of the SMS or MMS recipient and use this MDN to determine if the SMS or MMS is intended for a hunt group (versus a standard SMS or MMS message). If the MDN is associated with a hunt group, message handler 120 can bypass standard SMS or MMS delivery and instead forward the SMS or MMS message to the message server 104 for processing by a hunt group. In some embodiments, the message handler 120 can transmit the raw data packets of the SMS or MMS message to the message server 104. In other embodiments, message handler 120 can convert the SMS or MMS to a preconfigured format (e.g., IMAP, protocol buffer) and transmit the formatted message to the message server 104. If the message handler 120 does not handle protocol conversions, the message server 104 may do so instead.

The message server 104 can comprise one or more computing devices configured to receive messages destined for hunt groups and handle replies from the devices (e.g., device 102A, device 102B, device 102C). The message server 104 can store incoming messages received from the message handler 120 in database 122. In some embodiments, database 122 can comprise a storage device for storing incoming messages as well as replies. In some implementations, system 100 may periodically flush any messages or replies stored in database 122 that are older than ninety days.

In some embodiments, message server 104 can include a push gateway 106 that itself can be a dedicated server or other computing device. In an embodiment, the push gateway 106 can transmit notifications to the hunt group devices. In some implementations, the push gateway 106 can transmit a push notification or similar notification to the hunt group devices. The push gateway 106 may be configured to transmit the appropriate type of push notification based on the type of hunt group devices 102. For example, device 102A may comprise a device running iOS® while device 102B may comprise a device running Android® and device 102C may be running Windows®. As illustrated, the hunt group devices 102 may be a heterogenous set of devices and are not limited to mobile devices. Desktop applications and web-based applications may be running on hunt group devices 102 and receive notifications. In some embodiments, the push gateway 106 can identify the operating system or platform of the hunt group devices 102 and generate a corresponding push notification to the hunt group devices 102. In some embodiments, the hunt group devices 102 can receive the notifications and generate an alert or other visual indicator that a new message was received for a hunt group in which the hunt group devices 102 are members. In some embodiments, these notifications can be transmitted in parallel (i.e., each of the hunt group devices 102 may receive the notification at the same time). In other embodiments, the notifications can be transmitted in series until one of the hunt group devices 102 responds. The choice of ordering of the hunt group devices 102 is not limiting in such an embodiment.

The message server 104 further includes a storage proxy 114. In some embodiments, the storage proxy 114 may implement IMAP functionality, using the database 122 as the message data store, although the use of IMAP is not limiting and other message formats and technologies (e.g., message queues) may be used. As illustrated, hunt group devices 102 are communicatively coupled to the storage proxy 114 and may act as clients of the storage proxy 114. That is, each of the hunt group devices 102 may be associated with one or more accounts (e.g., IMAP mailboxes) stored in database 122. In some implementations, new messages will be transmitted from the database 122 to the hunt group devices 102 via the storage proxy 114 using standard messaging protocols such as IMAP, HTTP, or similar protocols. Once the messages arrive at the hunt group devices 102, the hunt group devices 102 may view and reply to messages using the same mail protocol.

In one embodiment, the first hunt group device to respond to a message transmits a reply back to the storage proxy 114. For instance, the first hunt group device can reply via an IMAP or other suitable protocol. The storage proxy 114 will receive this reply and add the reply to the hunt group account or mailbox. In some embodiments, the message server 104 can resolve conflicts by analyzing time stamps of multiple replies to the same message and identifying the earliest reply. In some embodiments, the push gateway 106 can also send a notification of the reply to all hunt group devices associated with a given account or mailbox. Ultimately, the message server 104 will then convert the first reply to a corresponding message format that the sender UE 124 can process. For example, if the sender UE 124 transmitted an SMS message, the message server 104 can convert the reply into an SMS-formatted response and transmit the SMS-formatted response to the sender UE 124 via the message handler 120.

As illustrated, system 100 can also include an administration server 118. In some embodiments, administration server 118 can be configured to provision the hunt group devices 102 during the creation of a hunt group. In some embodiments, administration server 118 can receive configuration data (e.g., account identifier, MDN, group identifier, etc.) and issue requests to other devices to coordinate the establishment of the hunt group. For example, administration server 118 can configure the message handler 120 to bypass standard SMS/MMS handling for the MDN. Administration server 118 can likewise provide the MDN and identity of hunt group devices 102 to the message server 104 to enable the foregoing processing. As illustrated, administration server 118 communicates with message server 104 via a services endpoint 108, which can comprise a network endpoint (e.g., Hypertext Transfer Protocol endpoint). In some embodiments, the services endpoint 108 can configure devices within the message server 104 based on the data received from administration server 118. Further, hunt group devices 102 can authenticate to the message server 104 via the services endpoint 108 by providing credentials that allow the services endpoint 108 to confirm that the hunt group devices 102 belong to an existing hunt group.

As will be discussed, the message server 104 can additionally transmit and receive control or synchronization messages to enable the hunt group devices 102 to coordinate a message interface. For example, after receiving a new message to the hunt group, the message server 104 can transmit a notification to the hunt group devices 102. In response, one or more of the hunt group devices 102 may read the message and the message server 104 can transmit the message along with a start control message to one or more of the hunt group devices 102. The first hunt group device that replies to the message will transmit a reply and a corresponding start acknowledgement control message. In response, the message server 104 can transmit an acknowledgement control message to all of the hunt group devices 102 after receiving the reply. In response to the acknowledgement control message, the hunt group devices 102 can update the user interface of a messaging application to indicate that a reply was sent. In some implementations, this updating can include displaying the reply on all of the hunt group devices 102, enabling a synchronized view of the conversation among hunt group devices 102. As illustrated in the foregoing, the control plane messages may synchronize a state of the conversation and can be repeated as messages are received. That is, the states can include a start state, a conversation state, and an end state. The start state refers to a state where the hunt group devices 102 were notified of a new message but a first reply has not yet been received. During the conversation state, a reply is received and all hunt group devices 102 are notified. During the conversation state, new messages from the original sender may be received and replied to. Thus, the conversation state may operate multiple times between two sub-states of receiving a message and receiving a corresponding reply. Ultimately, the state will transition to an end state when the conversation has ended either explicitly or due to a lack of new messages or replies. As will be discussed, in some implementations, an additional escalation state may be entered if an escalation point is contacted due to a lack of a response.

The system 100 may be implemented in various forms. In an embodiment, the message server 104 can be implemented via a single computing device (such as that depicted in FIG. 4). In some embodiments, message server 104 can be configured as a software application. In some embodiments, message server 104 can be implemented via multiple such computing devices running software to implement the functions described herein. In another embodiment, the various components and functions described above (and herein) may be implemented on a non-transitory computer-readable storage medium for tangibly storing computer program instructions capable of being executed by a computer processor. This medium can then be deployed to various hardware devices or may be virtualized and deployed in a containerized (or similar) environment.

Figure 2:
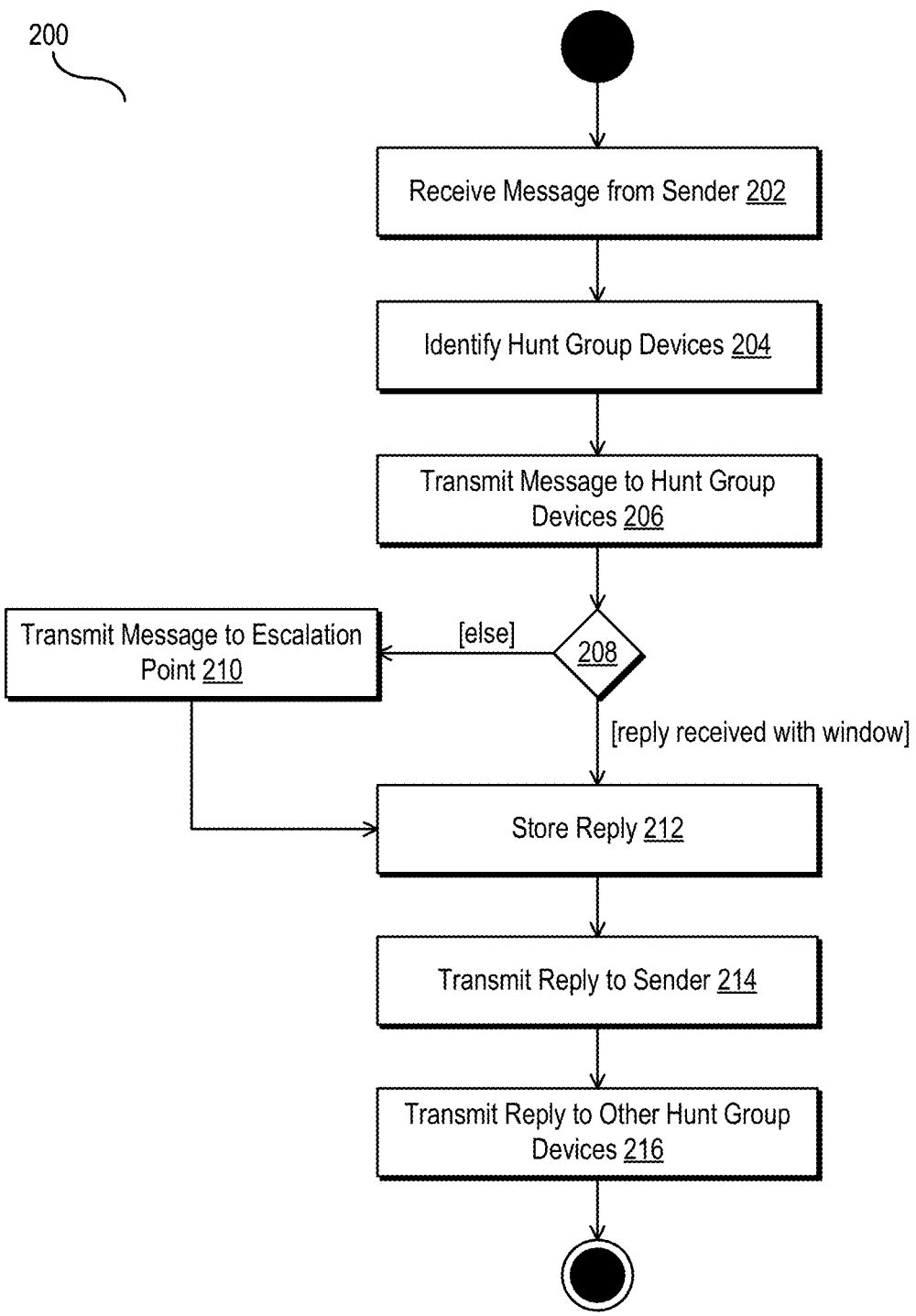
FIG. 2 is a flow diagram illustrating a method for providing hunt group messaging capabilities in a network.

FIG. 2 is a flow diagram illustrating a method for providing hunt group messaging capabilities in a network.

In step 202, method 200 can include receiving a message from a sender. In some embodiments, the message can include an MDN as the recipient address. In some embodiments, the message can comprise an SMS or MMS message that includes an MDN and is received from an SMSC or MMSC, respectively. As discussed above, an SMSC or MMSC (or similar type of message handler) may detect that a given message includes an MDN associated with a hunt group and forego normal SMS/MMS processing and forward the message to method 200.

In step 204, method 200 can include identifying one or more hunt group devices. In some embodiments, method 200 can include identifying a set of hunt group devices associated with the MDN of the message received in step 202.

In some embodiments, method 200 can include using the MDN to query a database of hunt group devices. In some embodiments, when a hunt group is established, a list of hunt group devices is provided and associated with an MDN of the hunt group. In an embodiment, the list of hunt group devices can be represented as a list of MDNs of the devices. In other embodiments, account names or other types of identifiers can be used to identify hunt group devices.

In step 206, method 200 can include transmitting the message to each hunt group device in the set of hunt group devices.

In some embodiments, step 206 can include converting an SMS or MMS message to an IMAP-formatted message (or a similar type of format). In other embodiments, the message received in step 202 may already be formatted as such. In some embodiments, step 206 can include writing the message to a mailbox associated with either the MDN or each of the individual hunt group devices. In some embodiments, this mailbox can comprise an IMAP mailbox that each of the hunt group devices is configured to access. In some embodiments, an intermediate data cache can be used to temporarily store the message before a sync handler copies the message to an IMAP database.

In some embodiments, using IMAP, method 200 can push messages to all subscribers of the IMAP mailbox (i.e., the hunt group devices). In other embodiments, a pull protocol can be used whereby hunt group devices periodically request messages from the mailbox. As discussed previously, no limit is placed on the type of the hunt group devices, and the IMAP requests may be issued by mobile applications, desktop applications, web-based applications, etc.

In some embodiments, as part of step 206, method 200 can include transmitting a notification to an application executing on the hunt group devices indicating that a new message was received. In some embodiments, this notification can comprise a push notification sent to applications of the hunt group devices. In some embodiments, the hunt group devices can display the application notification to alert a user of the hunt group device that a message is awaiting reading. In some embodiments, the application can simultaneously download the message via an IMAP protocol, as described above. In an alternative embodiment, the application may download the message via IMAP and generate a local notification of the downloading.

In some implementations, one or more of the hunt group devices may read the message and the message server can transmit the message content in response along with a start control message to one or more of the hunt group devices.

In step 208, method 200 can include determining if a reply to the message was received within a designated time window. In some implementations, the first hunt group device that replies to the message can transmit a reply and a corresponding start acknowledgement control message. In some embodiments, after sending the message to the hunt group devices, method 200 can set a time window in which to await replies to the message. If a message is received from one of the hunt group devices during this time window, method 200 proceeds to step 212. However, if no response is received, method 200 proceeds to step 210. In some embodiments, method 200 receives a response by monitoring the IMAP mailbox associated with the MDN. In some embodiments, an application on a hunt group device can be used to reply to the message and generate an IMAP message which is sent to the IMAP mailbox. In some embodiments, other protocols may be used to handle reply messages. In some embodiments, method 200 may receive multiple reply messages from different hunt group devices. In this scenario, method 200 may determine which hunt group device replied first (via timestamps on the messages) and select that reply as the reply to return to the sender in step 214.

In step 210, method 200 does not receive a reply from a hunt group device within the time window and instead transmits the message to an escalation point. In an embodiment, an escalation point refers to a hunt group device that is designated as the recipient of a message after the time window expires. In some embodiments, transmitting the message to the escalation point can be performed in the same manner as step 206 (via an IMAP mailbox for the escalation point). In another embodiment, the escalation point device may subscribe to the same mailbox as the other hunt group devices. However, the user interface for the escalation point device may be configured to only display the message (and any related notifications) when the time window expires. In some embodiments, method 200 can perform step 210 for different levels of escalation points based on whether a given escalation point has responded or not.

In step 212, method 200 can include storing a reply to the message. In the various embodiments, the message stored in step 212 can include either a hunt group device reply or an escalation point reply. In some embodiments, the first received reply may be used as the canonical reply and stored in step 212. In some embodiments, storing the reply can include updating the IMAP mailbox associated with the MDN in the sender's message accordingly, as discussed above.

In step 214, method 200 can include transmitting the reply to the sender. In an embodiment, step 214 can include converting the reply to a format recognizable by the sender. For instance, if the sender transmitted an SMS message, step 214 can include converting an IMAP reply into an SMS message and sending the SMS reply to the user (via an SMSC). Similar techniques can be used for MMS messages. When using SMS or MMS, step 214 can also include setting a sender field of the SMS or MMS as the MDN. Thus, from the perspective of the sender, the message to the MDN will receive a reply from the same MDN, despite the reply originating from one or many potential users.

In step 216, method 200 can include transmitting the reply to other hunt group devices. In some embodiments, the other hunt group devices can include all other hunt group devices except for the hunt group device that sent the reply. In some embodiments, method 200 can exclude any escalation point devices from receiving replies unless an escalation point device sends the reply. In response, method 200 can also transmit an acknowledgement control message to all of the hunt group devices after receiving the reply. In response to the acknowledgement control message, the hunt group devices can update the user interface of a messaging application to indicate that a reply was sent. In some implementations, this updating can include displaying the reply on all of the hunt group devices, enabling a synchronized view of the conversation among hunt group devices.

In an embodiment, transmitting the reply to other hunt group devices can include pushing the IMAP reply back to each hunt group device via the IMAP mailbox that stores messages and replies. Additionally, step 216 can include sending a push notification to the other hunt group devices, alerting them that a reply was sent from the replying hunt group device.

The foregoing method 200 can be applied repeatedly to facilitate a session of messages between a sender and a hunt group device. In some embodiments, once a hunt group device responds to a first message, future messages may be routed first to that hunt group device, similar to the process used for escalation points. For example, other users may not display subsequent messages to allow time for the first replying hunt group device to respond to the user.

Figure 3:
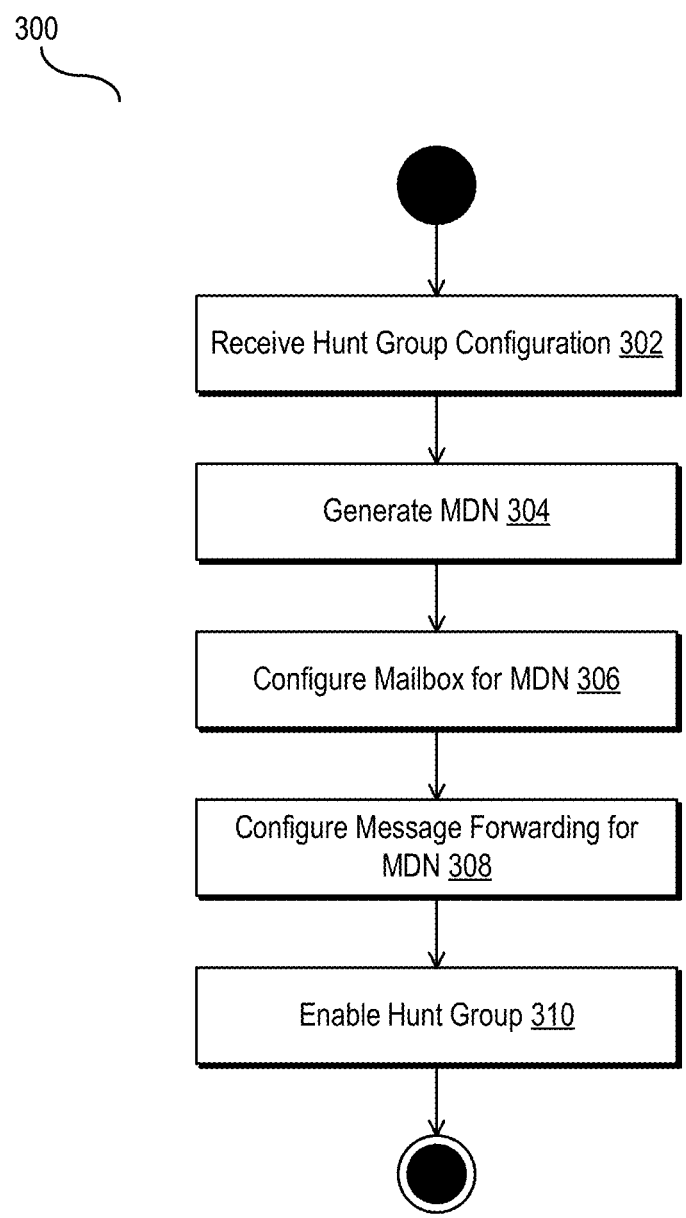
FIG. 3 is a flow diagram illustrating a method for establishing a hunt group in a network.

FIG. 3 is a flow diagram illustrating a method for establishing a hunt group in a network.

In step 302, method 300 can include receiving hunt group configuration data. In some embodiments, the hunt group configuration data include data defining a hunt group for a set of hunt group devices and escalation points. As a non-limiting example, the hunt group configuration data can include a name of an organization, the name of the hunt group, a time window duration (for escalating messages), and a list of hunt group devices. In some embodiments, the list of hunt group devices can be represented as a list of MDNs, user identifiers, email addresses, or other types of identifying data.

In step 304, method 300 can include generating a new MDN for the hunt group. In some embodiments, the MDN can comprise a virtual MDN that can be created in an ad hoc fashion for each new hunt group. Details of creating a new MDN in a network are non-limiting and not described in full detail herein.

In step 306, method 300 can include configuring a mailbox for the MDN. In some embodiments, each MDN is set up with a dedicated IMAP (or any storage format) mailbox. In some embodiments, each hunt group device is configured to be able to authenticate and access the corresponding mailbox.

In step 308, method 300 can include configuring message forwarding for the MDN.

As discussed above, sender UEs will transmit messages such as SMS or MMS messages to the MDN. Absent method 300, such messages would be delivered to a device associated with the MDN. However, in step 308, method 300 configures a message handler (e.g., an SMSC or MMSC) to intercept such messages and deliver the messages to a platform for processing hunt group messages (e.g., message server 104). As such, method 300 can provide the hunt group MDN and specify that forwarding to the hunt group server should be enabled. In some embodiments, method 300 can also provide a class of service (CoS) parameter to tag and/or shape the message traffic.

In step 310, method 300 can include enabling the hunt group. In this step, method 300 can signal the hunt group server to inform the server that all necessary configurations have been completed. After step 308, a message handler will begin to send intercepted messages to the hunt group server, which can then process messages according to method 200.

Figure 4:
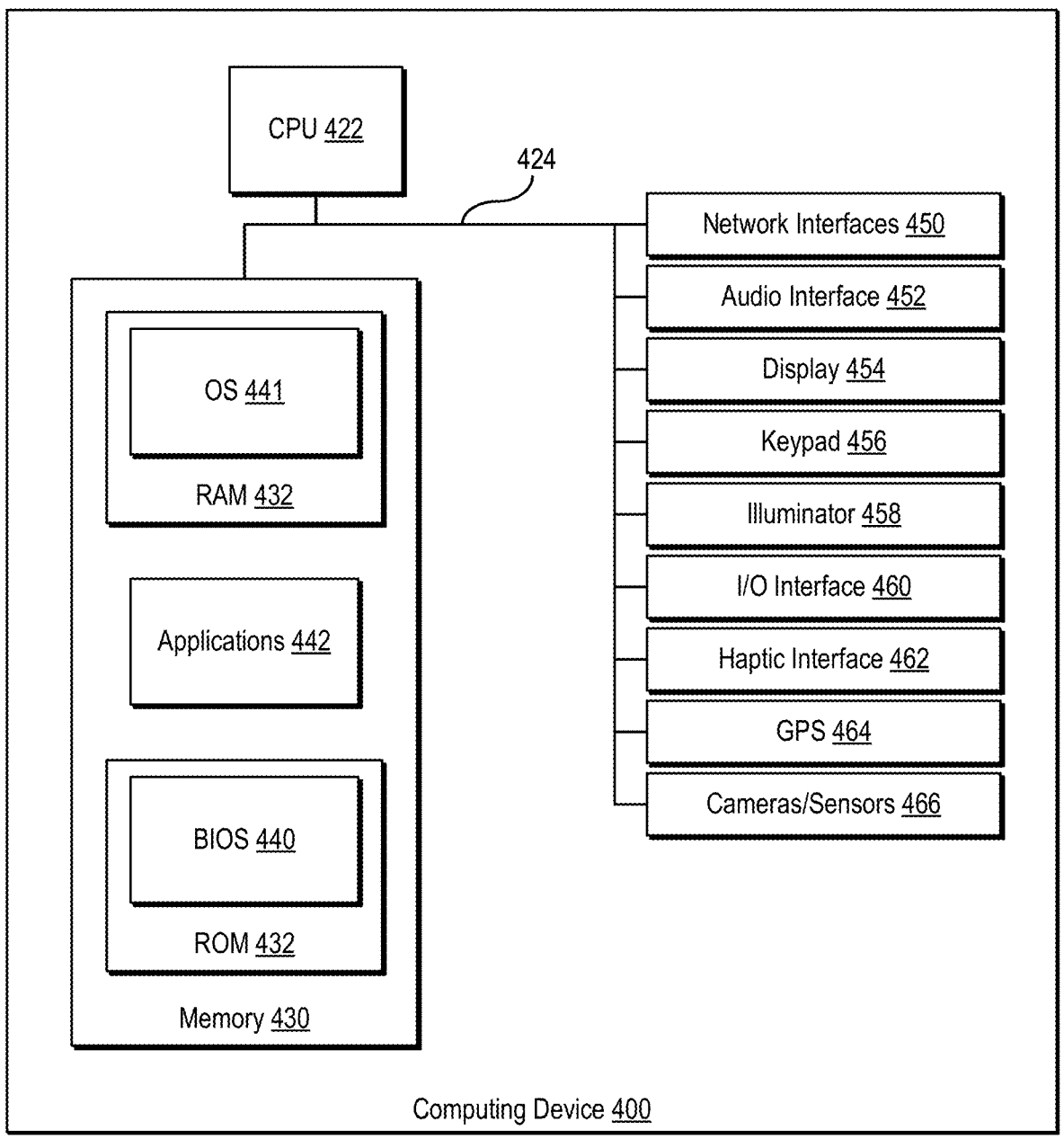
FIG. 4 is a block diagram of a computing device.

FIG. 4 is a block diagram of a computing device.

The computing device 400 may include more or fewer components than those shown in FIG. 4, depending on the deployment or usage of the computing device 400. For example, a server computing device, such as a rack-mounted server, may not include an audio interface 452, display 454, keypad 456, illuminator 458, haptic interface 462, Global Positioning System receiver 464, or sensors 466 (e.g., camera, temperature sensor, etc.). Some devices may include additional components not shown, such as graphics processing unit (GPU) devices, cryptographic coprocessors, artificial intelligence (AI) accelerators, or other peripheral devices.

As shown in the figure, the computing device 400 includes a central processing unit (CPU) 822 in communication with a mass memory 430 via a bus 424. The computing device 400 also includes a network interface 450, an audio interface 452, a display 454, a keypad 456, an illuminator 458, an input/output interface 460, a haptic interface 462, a Global Positioning System receiver 464 and cameras or sensors 466 (e.g., optical, thermal, or electromagnetic sensors). Computing device 400 can include sensors 466. The positioning of the sensors 466 on the computing device 400 can change per computing device 400 model, per computing device 400 capabilities, and the like, or some combination thereof.

In some embodiments, the CPU 422 may comprise a general-purpose CPU. The CPU 422 may comprise a single-core or multiple-core CPU. The CPU 422 may comprise a system-on-a-chip (SoC) or a similar embedded system. In some embodiments, a GPU may be used in place of, or in combination with, a CPU 422. Mass memory 430 may comprise a dynamic random-access memory (DRAM) device, a static random-access memory device (SRAM), or a Flash (e.g., NAND Flash) memory device. In some embodiments, mass memory 430 may comprise a combination of such memory types. In one embodiment, the bus 424 may comprise a Peripheral Component Interconnect Express (PCIe) bus. In some embodiments, the bus 424 may comprise multiple busses instead of a single bus.

Mass memory 430 illustrates another example of computer storage media for the storage of information such as computer-readable instructions, data structures, program modules, or other data. Mass memory 430 stores a basic input/output system, BIOS 440, for controlling the low-level operation of the computing device 400. The mass memory also stores an operating system 441) for controlling the operation of the computing device 400.

Applications 442 may include computer-executable instructions which, when executed by the computing device 400, perform any of the methods (or portions of the methods) described previously in the description of the preceding figures. In some embodiments, the software or programs implementing the method embodiments can be read from a hard disk drive (not illustrated) and temporarily stored in RAM 432 by CPU 422. CPU 422 may then read the software or data from RAM 432, process them, and store them to RAM 432 again.

The computing device 400 may optionally communicate with a base station (not shown) or directly with another computing device. Network interface 450 is sometimes known as a transceiver, transceiving device, or network interface card (NIC).

The audio interface 452 produces and receives audio signals such as the sound of a human voice. For example, the audio interface 452 may be coupled to a speaker and microphone (not shown) to enable telecommunication with others or generate an audio acknowledgment for some action. Display 454 may be a liquid crystal display (LCD), gas plasma, light-emitting diode (LED), or any other type of display used with a computing device. Display 454 may also include a touch-sensitive screen arranged to receive input from an object such as a stylus or a digit from a human hand.

Keypad 456 may comprise any input device arranged to receive input from a user. Illuminator 458 may provide a status indication or provide light.

The computing device 400 also comprises an input/output interface 460 for communicating with external devices, using communication technologies, such as USB, infrared, Bluetooth™, or the like. The haptic interface 462 provides tactile feedback to a user of the client device.

The Global Positioning System receiver 464 can determine the physical coordinates of the computing device 400 on the surface of the Earth, which typically outputs a location as latitude and longitude values. Global Positioning System receiver 464 can also employ other geo-positioning mechanisms, including, but not limited to, triangulation, assisted GPS (AGPS), E-OTD, CI, SAI, ETA, BSS, or the like, to further determine the physical location of the computing device 400 on the surface of the Earth. In one embodiment, however, the computing device 400 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the example embodiments as set forth in the claims that follow. The specification and drawings are accordingly to be regarded in an illustrative rather than restrictive sense.

We claim:

1. A method comprising:
   receiving, via a network, a message addressed to a mobile device number (MDN), the message comprising one of a short message service (SMS) message or a multimedia messaging service (MMS) message;
   identifying, by the network, a set of hunt group devices associated with the MDN, the set of hunt group devices including at least a first hunt group device and a second hunt group device;
   transmitting, by the network, the message to each hunt group device in the set of hunt group devices;
   receiving, by the network, a reply to the message from the first hunt group device;
   transmitting, by the network, the reply to a sender of the message; and
   transmitting, by the network, the reply to at least the second hunt group device.

2. The method of claim 1, wherein receiving the message comprises receiving the message via one of a Short Message Service Center (SMSC) or Multimedia Messaging Service Center (MMSC) of the network.

3. The method of claim 1, wherein transmitting the message to each hunt group device in the set of hunt group devices comprises transmitting a push notification to an application executing on a respective hunt group device.

4. The method of claim 1, further comprising writing the message to a mailbox associated with the MDN.

5. The method of claim 4, wherein receiving a reply to the message from the first hunt group device comprises writing the reply to the mailbox associated with the MDN.

6. The method of claim 1, wherein transmitting the reply to a sender of the message comprises converting the reply to a mobile message and transmitting the mobile message to the sender.

7. The method of claim 6, wherein a sender field of the mobile message is set to the MDN.

8. A non-transitory computer-readable storage medium for tangibly storing computer program instructions capable of being executed by a processor, the computer program instructions defining steps of:
   receiving, via a network, a message addressed to a mobile device number (MDN), the message comprising one of a short message service (SMS) message or a multimedia messaging service (MMS) message;
   identifying, by the network, a set of hunt group devices associated with the MDN, the set of hunt group devices including at least a first hunt group device and a second hunt group device;
   transmitting, by the network, the message to each hunt group device in the set of hunt group devices;
   receiving, by the network, a reply to the message from the first hunt group device;
   transmitting, by the network, the reply to a sender of the message; and
   transmitting, by the network, the reply to at least the second hunt group device.

9. The non-transitory computer-readable storage medium of claim 8, wherein receiving the message comprises receiving the message via one of a Short Message Service Center (SMSC) or Multimedia Messaging Service Center (MMSC) of the network.

10. The non-transitory computer-readable storage medium of claim 8, wherein transmitting the message to each hunt group device in the set of hunt group devices comprises transmitting a push notification to an application executing on a respective hunt group device.

11. The non-transitory computer-readable storage medium of claim 8, the steps further comprising writing the message to a mailbox associated with the MDN.

12. The non-transitory computer-readable storage medium of claim 11, wherein receiving a reply to the message from the first hunt group device comprises writing the reply to the mailbox associated with the MDN.

13. The non-transitory computer-readable storage medium of claim 8, wherein transmitting the reply to a sender of the message comprises converting the reply to a mobile message and transmitting the mobile message to the sender.

14. The non-transitory computer-readable storage medium of claim 13, wherein a sender field of the mobile message is set to the MDN.

15. A device comprising:
    a processor configured to:
       receive a message addressed to a mobile device number (MDN), the message comprising one of a short message service (SMS) message or a multimedia messaging service (MMS) message;
       identify a set of hunt group devices associated with the MDN, the set of hunt group devices including at least a first hunt group device and a second hunt group device;
       transmit the message to each hunt group device in the set of hunt group devices;
       receive a reply to the message from the first hunt group device;
       transmit the reply to a sender of the message; and
       transmit the reply to at least the second hunt group device.

16. The device of claim 15, wherein receiving the message comprises receiving the message via one of a Short Message Service Center (SMSC) or Multimedia Messaging Service Center (MMSC).

17. The device of claim 15, wherein transmitting the message to each hunt group device in the set of hunt group devices comprises transmitting a push notification to an application executing on a respective hunt group device.

18. The device of claim 15, further comprising writing the message to a mailbox associated with the MDN.

19. The device of claim 18, wherein receiving a reply to the message from the first hunt group device comprises writing the reply to the mailbox associated with the MDN.

20. The device of claim 18, wherein transmitting the reply to a sender of the message comprises converting the reply to a mobile message and transmitting the mobile message to the sender, wherein a sender field of the mobile message is set to the MDN.

* * * * *